(12) United States Patent
Baker

(10) Patent No.: US 9,696,781 B2
(45) Date of Patent: Jul. 4, 2017

(54) AUTOMATED POWER CONTROL FOR REDUCING POWER USAGE IN COMMUNICATIONS NETWORKS

(71) Applicant: CISCO TECHNOLOGY, INC., San Jose, CA (US)

(72) Inventor: Frederick Baker, Goleta, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/724,466

(22) Filed: May 28, 2015

(65) Prior Publication Data

US 2016/0349820 A1    Dec. 1, 2016

(51) Int. Cl.
*G06F 1/32*      (2006.01)
*G06F 11/30*     (2006.01)
*G06F 9/48*      (2006.01)
*G06F 9/50*      (2006.01)
*G06F 11/34*     (2006.01)

(52) U.S. Cl.
CPC .......... *G06F 1/3209* (2013.01); *G06F 1/3293* (2013.01); *G06F 9/4856* (2013.01); *G06F 9/5088* (2013.01); *G06F 11/3006* (2013.01); *G06F 11/3062* (2013.01); *G06F 11/3442* (2013.01); *G06F 2201/815* (2013.01)

(58) Field of Classification Search
CPC .. G06F 11/3062; G06F 1/3209; G06F 1/3293; G06F 9/4856; G06F 9/5088; G06F 11/3006; G06F 11/3442; G06F 2201/815
See application file for complete search history.

(56) References Cited

U.S. PATENT DOCUMENTS

| | | | | |
|---|---|---|---|---|
| 8,671,294 B2* | 3/2014 | Malik | .................. | G06F 1/3203 713/320 |
| 8,891,588 B1* | 11/2014 | Hui | ........................ | H04L 45/48 375/130 |
| 2009/0228726 A1* | 9/2009 | Malik | .................. | G06F 1/3203 713/320 |
| 2011/0040532 A1* | 2/2011 | Hamann | ............ | H05K 7/20836 703/2 |
| 2011/0239010 A1* | 9/2011 | Jain | ........................ | G06F 1/3209 713/310 |
| 2012/0272075 A1* | 10/2012 | Calo | .................. | H05K 7/20836 713/300 |
| 2012/0284216 A1* | 11/2012 | Hamann | ................. | G06F 1/206 706/12 |
| 2013/0086399 A1 | 4/2013 | Tychon et al. | | |
| 2013/0191658 A1* | 7/2013 | Malik | .................. | G06F 1/3209 713/300 |
| 2013/0191663 A1 | 7/2013 | Overcash et al. | | |
| 2013/0339759 A1* | 12/2013 | Doddavula | ........... | G06F 1/3206 713/300 |

(Continued)

OTHER PUBLICATIONS www.synapsense.com, Jun. 26, 2015.

*Primary Examiner* — M Elamin
(74) *Attorney, Agent, or Firm* — Cindy Kaplan

(57) ABSTRACT

In one embodiment, a method includes monitoring power usage parameters in a data center at a controller and automatically modifying components within the data center to reduce power usage based on the power usage parameters. The power usage parameters include routing distances between the components within the data center. An apparatus and logic are also disclosed herein.

19 Claims, 5 Drawing Sheets

(56) References Cited

U.S. PATENT DOCUMENTS

| | | |
|---|---|---|
| 2014/0269470 A1 | 9/2014 | Hybertson et al. |
| 2014/0289544 A1 | 9/2014 | Bailey et al. |
| 2014/0289549 A1 | 9/2014 | Bailey et al. |
| 2014/0298349 A1 | 10/2014 | Jackson et al. |
| 2015/0143153 A1* | 5/2015 | German .................. H04Q 1/136 713/324 |
| 2016/0006471 A1* | 1/2016 | Pande .................. G06F 15/7825 455/500 |

* cited by examiner

AUTOMATED POWER CONTROL FOR REDUCING POWER USAGE IN COMMUNICATIONS NETWORKS

TECHNICAL FIELD

The present disclosure relates generally to communications networks, and more particularly, to reduction of power usage in data center networks.

BACKGROUND

Today's data center architectures need to support a highly-mobile workforce, proliferation of devices, data-driven business models, and also be capable of seamlessly incorporating cloud applications and services. In order to meet these needs, power usage in data centers continues to rise. The double impact of rising data center energy consumption and rising energy costs has elevated the importance of data center efficiency as a strategy to reduce costs, manage capacity, and promote environmental responsibility.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises monitoring power usage parameters in a data center at a controller and automatically modifying components within the data center to reduce power usage based on the power usage parameters. The power usage parameters include routing distances between the components within the data center.

In another embodiment, an apparatus generally comprises an interface for communication with components of a data center, a processor for monitoring power usage parameters in the data center and automatically modifying the components within the data center to reduce power usage based on the power usage parameters, and memory for storing the power usage parameters. The power usage parameters include routing distances between the components within the data center.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

A data center may include any number of physical network devices, which host any number of virtual machines. Various network operating systems may be used to manage and move virtual machines. In conventional networks, movement of virtual machines with a view to minimize power usage would have to be done consciously by data center operators. Also, in order for data center operators to reduce power outlay, unused machines would need to be turned off manually by the operators.

The embodiments described herein provide for automatic environmental power control in communication networks. As described in detail below, the embodiments provide for automatic detection of physical machine usage and may, for example, turn power off to physical machines and utilize network topology in making decisions as to where to instantiate or move a virtual machine.

Figure 1:
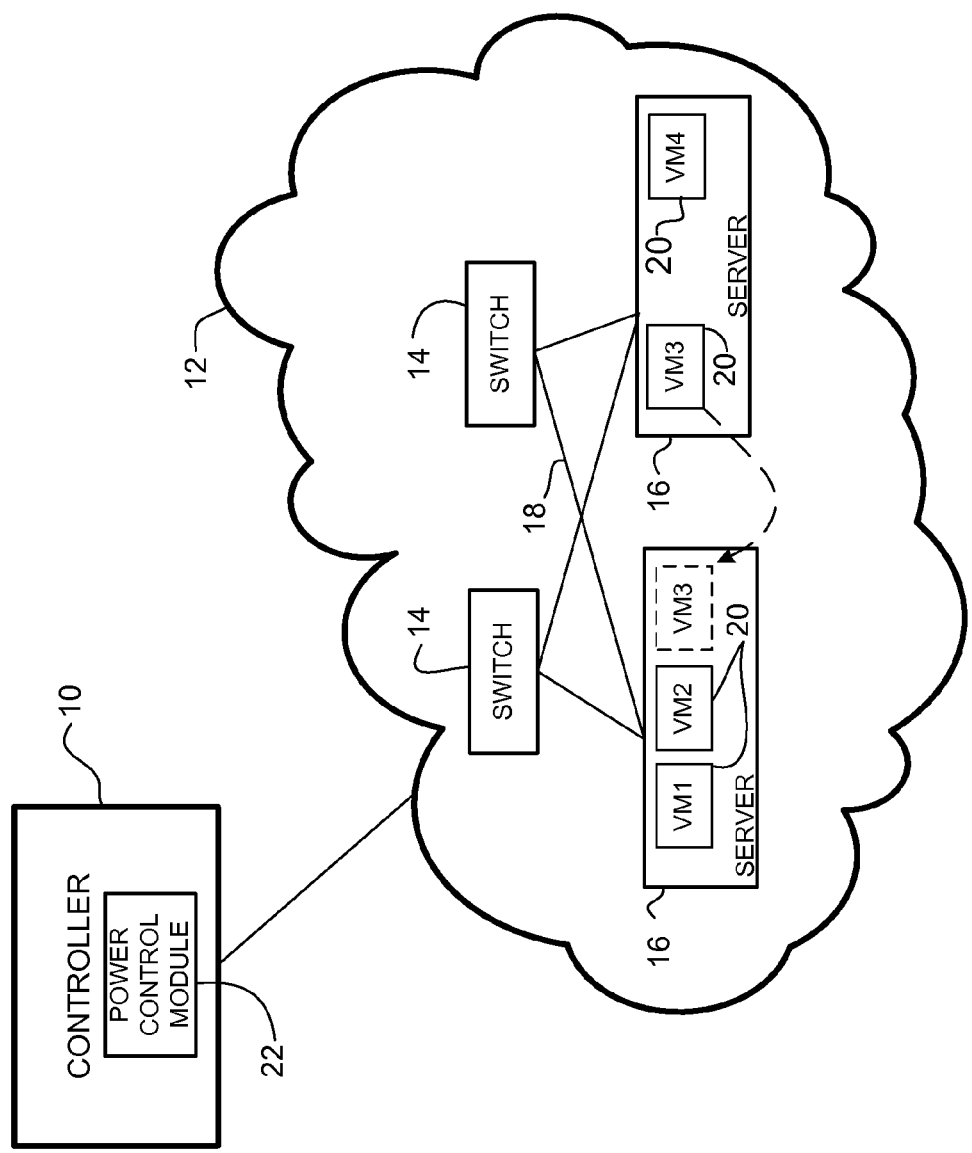
FIG. 1 illustrates an example of a network in which embodiments described herein may be implemented.

Referring now to the drawings, and first to FIG. 1, a network in which embodiments described herein may be implemented is shown. The embodiments operate in the context of a data communication network including multiple network devices. For simplification, only a small number of nodes are shown. The network may include any number of network devices in communication via any number of nodes (e.g., routers, switches, controllers, gateways, access layer devices, aggregation layer devices, edge devices, core devices, or other network devices), which facilitate passage of data within the network.

The network shown in the example of FIG. 1 includes a controller 10 in communication with a data center 12 comprising a plurality of switches 14 in communication with a plurality of hosts (servers) 16 via links 18. The controller 10 may be in communication with one or more networks 12 and there may be any number of network devices interposed between the nodes shown in FIG. 1. Also, the data center 12 may include more than one controller 10 (e.g., in a multi-tenant environment). The data center 12 may also comprise interconnected data centers or any network comprising network devices such as switches and servers. The term 'data center' as used herein may refer to any network or group of network devices.

The switch may comprise any network device (e.g., switch, switch/router) or group of network devices configured to perform forwarding functions. As described below with respect to FIG. 2, the switches may comprise a plurality of routers and switches.

The host 16 may be, for example, a server or any other type of network device operable to host virtual machines 20 (e.g., VM1, VM2, VM3, VM4 in FIG. 1). The host 16 may be implemented as various combinations of computing elements and other network elements. The virtual machines 20 may be moved (referred to, for example, as virtual machine mobility, vMotion, live migration, or virtual machine migration) between hosts 16 (as shown for VM3 in FIG. 1) based on traffic patterns, hardware resources, or other criteria. The term 'virtual machine' as used herein may refer to a virtual machine or container. As described below, the controller 10 may decide where to instantiate or move the virtual machine 20 with a view to minimize power usage.

The controller 10 may comprise, for example, an OpenStack controller, OpenDaylight (ODL) controller, SDN (Software-Defined Networking) controller, or any other network device, platform, operating system, or orchestration technology. The controller 10 may be a physical device or a virtual element, and may be located at one network device or distributed throughout the network at different network devices in communication with one another or a central controller, for example. The controller 10 may be configured, for example, to manage the data center 12, virtual machines 20, and applications. The controller 10 may communicate with a virtual machine monitor such as hypervisor installed on the server 16.

In one embodiment, the controller 10 includes a power control module 22 operable to monitor power usage parameters and make decisions as to whether to turn power on or off to the servers 16 or where to instantiate or move a virtual machine 20. The power control module 22 may be used, for example, to monitor activity, loads, available capacity, or load predictions based on history, and calculate or track routing metrics, routing distances, network diameter, or other parameters that may be used to minimize power usage in the data center. The power control module 22 may use any combination of these or other parameters to initiate one or more actions to reduce power usage in the data center 12. For example, the controller 10 may automatically modify one or more components (e.g., server 16, virtual machine 20) within the data center to minimize power usage.

Actions taken by the controller 10 to minimize power usage based on the power usage parameters may include, for example, changing operating mode of the physical network device 16 (e.g., turning power off for one or more servers, placing one or more servers in a low power mode), selecting a physical network device at which to place a virtual machine 20 (e.g., instantiating a new virtual machine or migration of an existing virtual machine) based on routing distances, or moving a virtual machine based on available capacity and number of virtual machines operating on the network device. Examples of automated power control based on power usage parameters are described further below.

Figure 2:
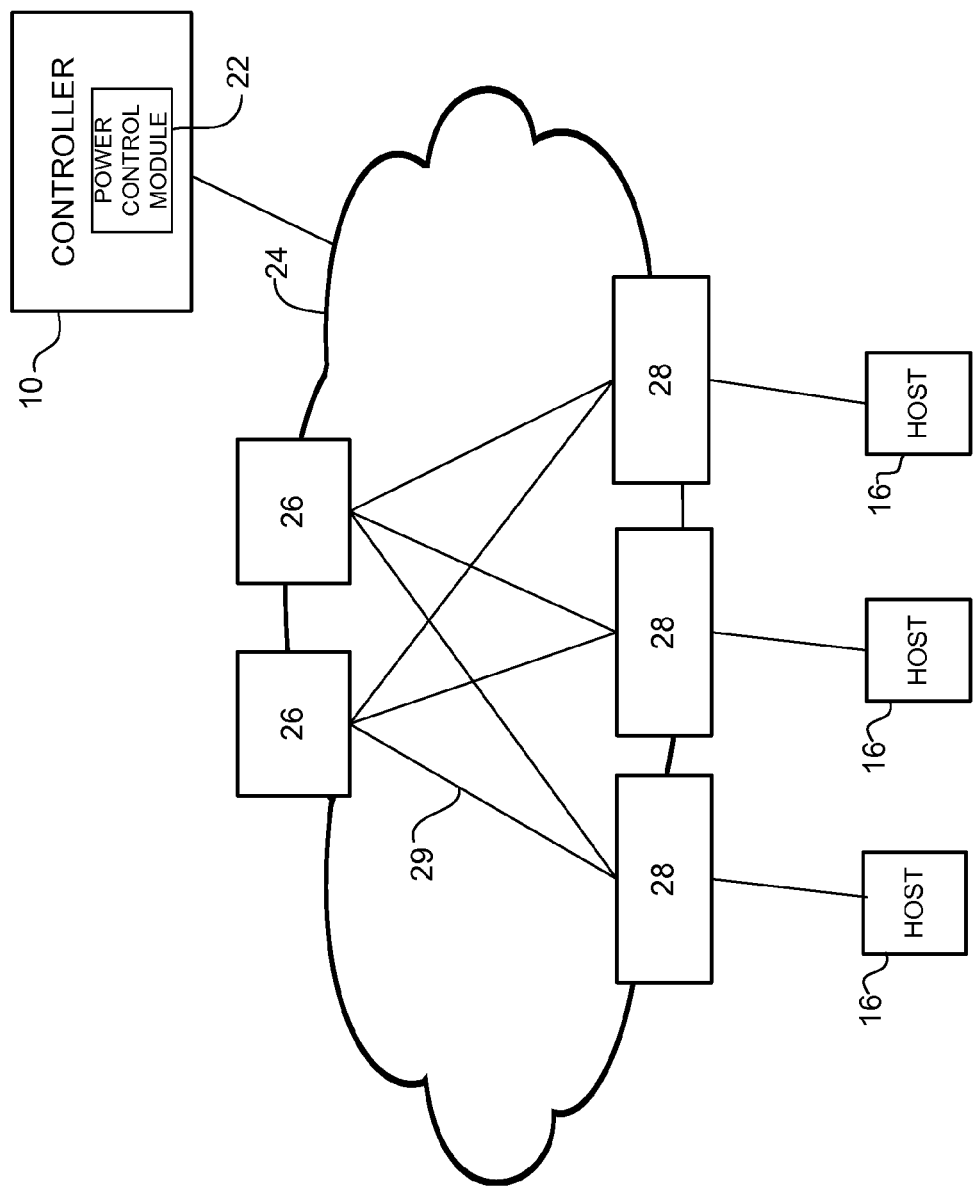
FIG. 2 illustrates an example of a switch topology within the network of FIG. 1.

Referring now to FIG. 2, an example of a switch fabric 24 comprising a plurality of network devices 26, 28 is shown. The network devices 26, 28 may comprise network switching or routing elements configured to perform forwarding functions (e.g., L2, L3, or L2/L3 devices). In one example, the network 24 includes a plurality of distribution switches 26 in communication with a plurality of Top-of-Rack (ToR) switches 28. This topology may be referred to as a spine-leaf topology. The ToR switches 28 may connect to one or more hosts 16 (e.g., servers hosting virtual machines as described above with respect to FIG. 1). The switches 28 may also include any number of End-of-Row switches. Each ToR switch 28 is connected to each of the distribution switches 26 via communication links 29 and is configured to route communications between the hosts 16 and other network elements. The topology shown in FIG. 2 may include any number of network devices 26, 28 in communication with any number of hosts (servers, virtual machines). The network 24 may further include any number of edge devices, border nodes, intermediate (core) nodes, access layer devices, aggregation layer devices, or other network devices, which facilitate passage of data within the network.

One option for minimizing power usage in the data center is to reduce the topological distance communications have to travel within a tenant. Use of a local fiber rather than a remote connection, or eliminating the need to pass through distribution switch 26, may provide power savings. For example, communications between virtual machines located at hosts 16 connected to the same ToR switch 28, would require less power than communications between virtual machines located at hosts in communication with different ToR switches. Routing metrics may be used to calculate routing distances between components in the data center and a network routing diameter for a tenant. As described below, a server 16 at which to place a virtual machine 20 may be selected to minimize the routing diameter of the tenant and thereby reduce power usage in the data center.

It is to be understood that the networks shown in FIGS. 1 and 2 are only examples and that the embodiments described herein may be implemented in networks comprising different network topologies or network devices, or using different network protocols, without departing from the scope of the embodiments.

Figure 3:
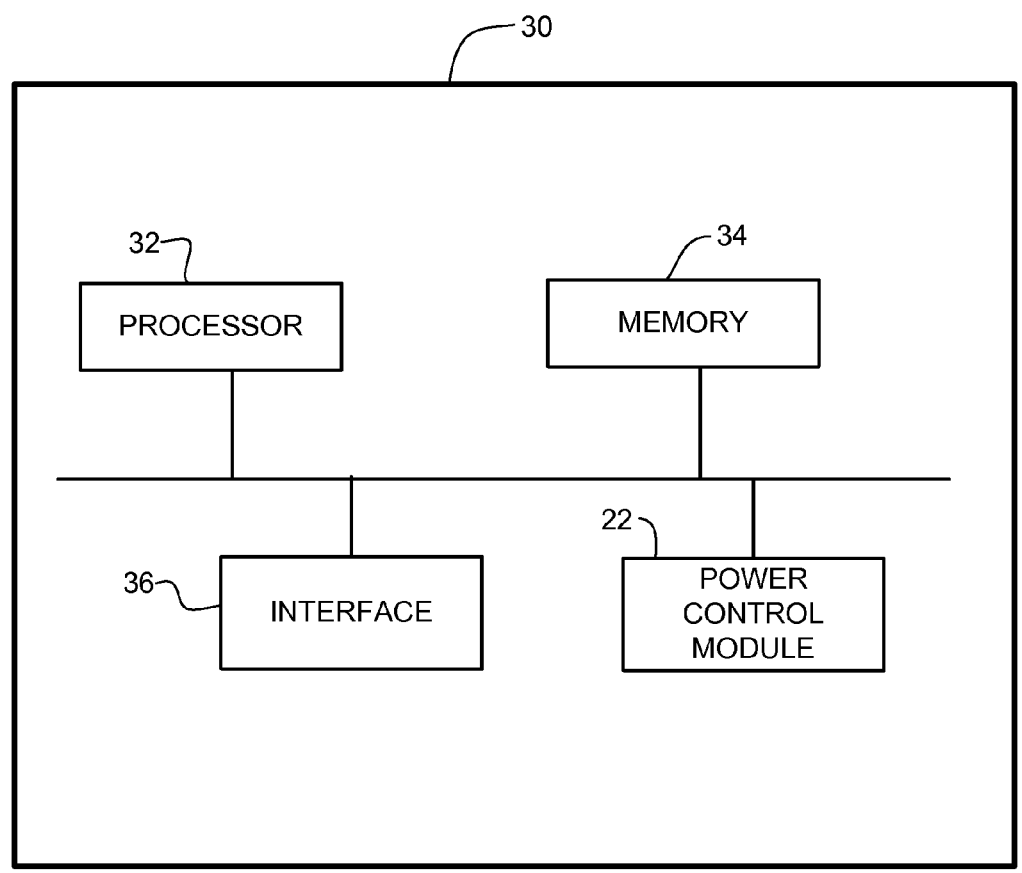
FIG. 3 depicts an example of a network device useful in implementing embodiments described herein.

FIG. 3 illustrates an example of a network device 30 (e.g., controller 10 in FIGS. 1 and 2) that may be used to implement the embodiments described herein. In one embodiment, the network device 30 is a programmable machine that may be implemented in hardware, software, or any combination thereof. The network device 30 includes one or more processor 32, memory 34, network interface 36, and power control module 22.

Memory 34 may be a volatile memory or non-volatile storage, which stores various applications, operating systems, modules, and data for execution and use by the processor 32. For example, components of power control module 22 (e.g., code, logic, software, firmware, etc.) may be stored in memory 34. Memory 34 may also store one or more data structures comprising information on power usage, network device state, server capacity or load, virtual machine location, network topology, or any combination of these or other parameters.

Logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In certain embodiments, logic may be encoded in non-transitory computer-readable media.

The network interface 36 may comprise any number of interfaces (linecards, ports) for receiving data or transmitting data to other devices. The network interface 36 may include, for example, an Ethernet interface for connection to a computer or network. The network interface 36 may be configured to transmit or receive data using a variety of different communication protocols. The interface 36 may include mechanical, electrical, and signaling circuitry for communicating data over physical links coupled to the network.

It is to be understood that the network device 30 shown in FIG. 3 and described above is only an example and that different configurations of network devices may be used. The network device 30 may further include any suitable combination of hardware, software, algorithms, processors, devices, components, or elements operable to facilitate the capabilities described herein.

Figure 4:
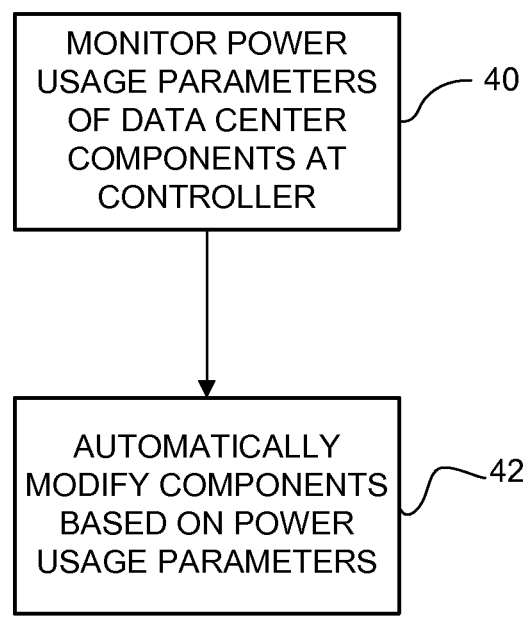
FIG. 4 is a flowchart illustrating an overview of a process for automated power control, in accordance with one embodiment.

FIG. 4 is a flowchart illustrating an overview of a process for automated environmental power control, in accordance with one embodiment. At step 40, the controller 10 monitors power usage parameters in the data center 12 (FIGS. 1 and 4). In one embodiment, the power usage parameters include routing distances between components (e.g., servers 16, virtual machines 20) in the data center 12. The power usage parameters may also include, for example, host information (e.g., power usage, number of virtual machines operating at the server, percentage storage/compute capacity available, load prediction based on operating history) and network topology information (e.g., routing metric, topological distance, average routing diameter). Based on the power usage parameters, the controller may 10 automatically modify one or more components within the data center 12 to reduce power usage (step 42), as described below with respect to FIG. 5.

Figure 5:
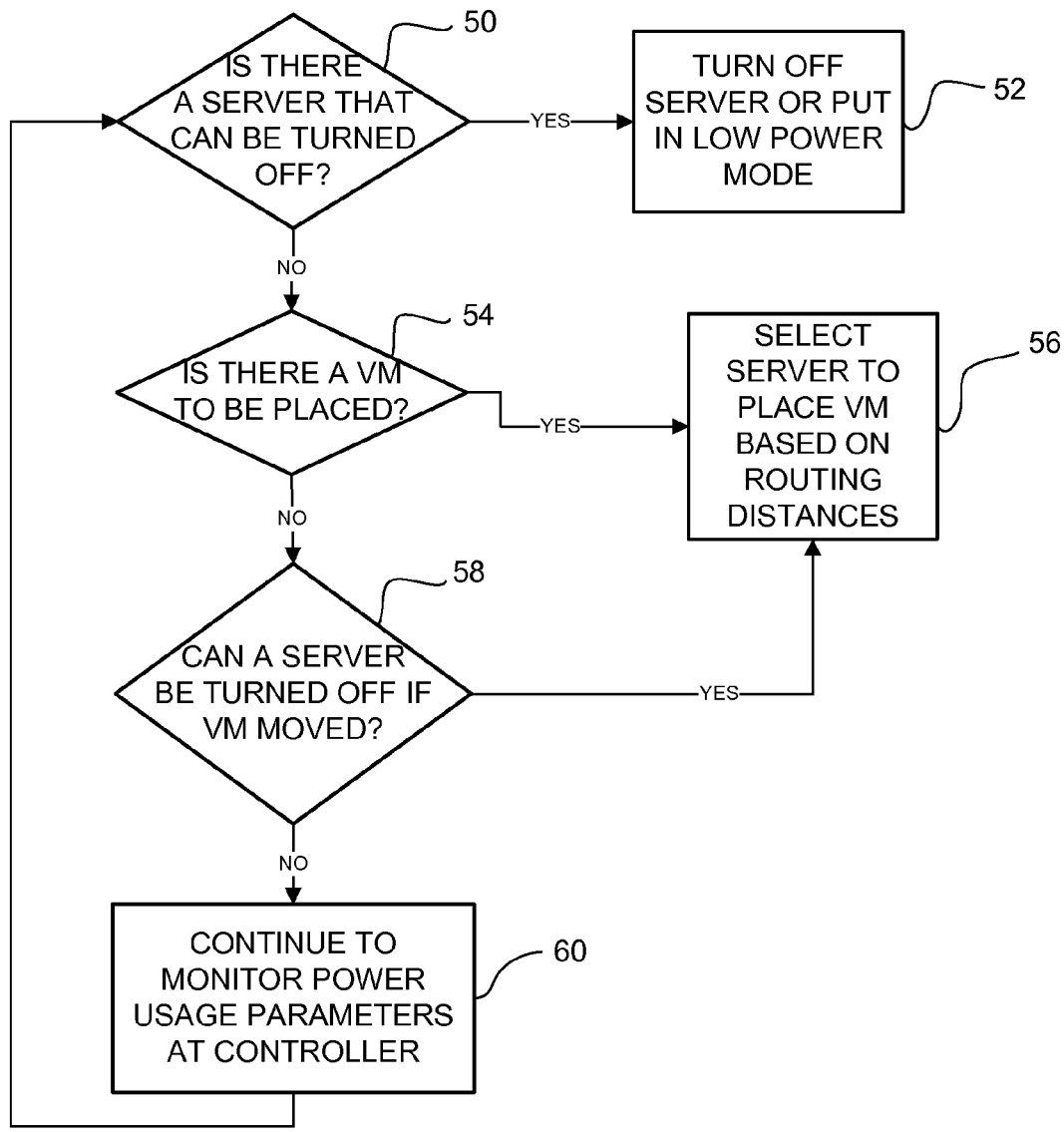
FIG. 5 is a flowchart illustrating details of the process shown in FIG. 4, in accordance with one embodiment.

FIG. 5 is a flowchart illustrating examples of changes that may be made to the data center components, in accordance with one embodiment. In one example, the controller 10 determines whether there is one or more physical network devices that can be turned off (e.g., power removed or put in low power mode) (step 50). For example, if there is a server 16 that has no virtual machines 20 operating thereon, the power may be turned off for that server (step 52). If there is a virtual machine 20 that needs to be placed at one of the servers 16 (e.g., new virtual machine to be instantiated or virtual machine move), the controller 10 may select one of the servers based on routing distances (steps 54 and 56). If a virtual machine 20 is moved from one of the servers 16, the controller 10 may look at the server to see if it can be turned off if a remaining virtual machine is moved (step 58). For example, if there is only one virtual machine 20 left at the server 16, the controller may select a new server to which to move the virtual machine (step 56) and turn off the power to that server after the virtual machine is moved (step 52). As described below, the controller 10 may implement a delay to prevent cycling of power or frequent virtual machine moves in the data center. The controller 10 continues to monitor power usage parameters of components within the data center (step 60).

It is to be understood that the processes shown in FIGS. 4 and 5, and described above are only examples and steps may be added, removed, modified, reordered, or combined, without departing from the scope of the embodiments.

The following describes implementation examples for initiating power saving actions as set forth above in the flowchart of FIG. 5. The controller 10 may be configured to automatically perform one or more of these or other actions based on the monitored power usage parameters to reduce power usage in the data center.

As shown at step 52 of the flowchart of FIG. 5, the controller 10 may turn off power to one or more servers 16 or put one or more servers in a low power mode. For example, the physical network device/machine (e.g., server 16 in FIG. 1) that consumes the least power may be turned off A server or group of servers may also be placed in low-power mode to improve power efficiency. A decision to turn off power to the server 16 may be based, for example, on power usage at the server. If there are no virtual machines 20 operating at the server 16 or expected to operate at the server for a period of time, power to the server may be turned off The controller 10 preferably keeps a minimum number of servers 16 active but vacant to place new or moving virtual machines, and shuts down a server in the event that it is unlikely to be needed for a minimum interval of time. For example, if the controller 10 determines that the server 16 has no immediate utility, it could be turned off. Since it may take a couple of minutes to shut down the server, the controller 10 may keep the server down for a predetermined period of time. When conditions warrant, the controller 10 may bring the server back up. In one example, the controller 10 allows one or more vacant servers 16 to remain up so that there is at least one server to which virtual machines 20 can be moved or started, without the need to bring a server back online immediately.

Any suitable hardware, software, module, or device may be used to turn on and off power to the physical devices. For example, addressable switches or an IP (Internet Protocol) addressable actuator may be used to turn power to a physical rack or chassis on or off.

At step 56 of the flowchart of FIG. 5, optimum placement of a virtual machine 20 is selected to minimize power usage. The selected placement may be for a new virtual machine or for a move of an existing virtual machine. For example, the virtual machine 20 may need to be moved to another server 16 based on limited resource availability at the current server. Power savings may be achieved by placing the virtual machine 20 at a server 16 selected to minimize the topological distance communications need to travel within a tenant.

In one example, a routing distance is calculated between any two network devices (e.g., using prefixes of addresses of the network devices) to provide an approximate measure of topological distance. If encapsulation technologies such as LISP (Locator Identifier Separation Protocol) or VxLAN (Virtual Extensible LAN (Local Area Network)) are used, the tenant identifiers may all belong to the same prefix, however, prefixes of the locators may be used to calculate the routing distance. An average network (routing) diameter may be calculated for each tenant (e.g., set of systems that regularly communicate with one another) based on routing metrics. The closer the systems are to each other, the smaller the routing metric. From a network perspective, the tenant that consumes the least power and generates the least heat is the one whose systems are closest together from a routing perspective, because each time a message crosses an interface it consumes power. In one embodiment, the network diameter expressed as a routing distance is used as a parameter to place virtual machines 20 in the data center in order to minimize power. When a virtual machine 20 is placed, whether because it is new or it is being moved, the virtual machine is preferably placed in a system that has just enough available capacity to execute it and that placement should minimize the network diameter of the tenant. Minimizing the topological distance that communications follow within a tenant benefits both the tenant and the data center.

When a virtual machine 20 is moved or closed, it may be possible to turn off the server 16 at which the virtual machine was located (step 58 of FIG. 5). In one embodiment, when a virtual machine 20 is moved, the controller 10 may determine how many virtual machines the server 16 that was executing the virtual machine has remaining. If the answer is greater than one, it may be a location to which to move virtual machines 20 to a given capacity availability. If there is only one virtual machine 20 left operating at the server 16 (e.g., VM 4 after VM 3 has been moved in FIG. 1), there may be value in moving the remaining virtual machine VM4 to another server. After the move, there will be zero virtual machines running at the server. In this case, the controller 10 may initiate a shut-down process on the server 16 (as described above with respect to step 52).

It should be noted that moving the virtual machine 20 is something that should not be done without due consideration. For example, if the virtual machine 20 goes idle, it is an immediate candidate to move. However, until it does, the controller 10 may want to watch the virtual machine 20 for idleness or move other virtual machines to the server hosting that virtual machine. In one example, the controller 10 may place a copy of the virtual machine in hibernation so that the instant the virtual machine goes idle, it can be flash-moved to the copy of the virtual machine and the original taken down.

It is to be understood that the power usage parameters and automatic component modifications made by the controller to reduce power usage as described above are only examples and that other parameters may be used or actions taken without departing from the scope of the embodiments.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
    monitoring at a controller, power usage parameters in a data center; and
    automatically modifying components within the data center to reduce power usage based on said power usage parameters;
    wherein said power usage parameters include routing distances between the components within the data center;
    wherein automatically modifying the components to reduce power usage comprises selecting a network device at which to place a virtual machine in the data center to minimize a network diameter calculated based on said routing distances; and
    wherein the components comprise network devices hosting virtual machines and automatically modifying the components comprises turning off power to one of the network devices or placing one of the network devices in a low power mode.

2. The method of claim 1 wherein said routing distances are based on routing metrics calculated between address prefixes of the components.

3. The method of claim 1 further comprising calculating a network diameter for a tenant in the data center based on said routing distances.

4. The method of claim 1 wherein automatically modifying the components comprises moving a virtual machine from a network device and identifying a number of virtual machines remaining at the network device.

5. The method of claim 4 wherein the number of virtual machines remaining at the network device is one and further comprising:
    moving the virtual machine to another network device; and
    turning power off to the network device from which the virtual machine was moved.

6. An apparatus comprising:
    an interface for communication with components of a data center;
    a processor for monitoring power usage parameters in the data center and automatically modifying the components within the data center to reduce power usage based on said power usage parameters; and
    memory for storing said power usage parameters;
    wherein automatically modifying the components comprises selecting, a network device at which to place a virtual machine in the data center to minimize a network diameter calculated based on said routing distances; and
    wherein said power usage parameters include routing, distances between the components within the data center and wherein modifying the components comprises changing an operating mode of at least one of the components to reduce power usage based on said power usage parameters.

7. The apparatus of claim 6 wherein said routing distances are based on routing metrics calculated between address prefixes of the components.

8. The apparatus of claim 6 wherein the processor is further operable to calculate a network diameter for a tenant in the data center based on said routing distances.

9. The apparatus of claim 6 wherein the components comprise network devices hosting virtual machines and automatically modifying the components comprises turning off power to one of the network devices.

10. The apparatus of claim 6 wherein the components comprise network devices hosting virtual machines and automatically modifying the components comprises placing one of the network devices in a low power mode.

11. The apparatus of claim 6 wherein automatically modifying the components comprises moving a virtual machine from a network device and identifying a number of virtual machines remaining at the network device.

12. The apparatus of claim 11 wherein a number of virtual machines remaining at a network device is one and wherein the processor is further operable to move the virtual machine to another network device and turn power off to the network device from which the virtual machine was moved.

13. Logic encoded on one or more non-transitory computer readable media and when executed by a processor operable to:
    monitor power usage parameters in a data center; and
    automatically modify components within the data center to reduce power usage;
    wherein said power usage parameters include routing distances between the components within the data center;
    wherein automatically modifying the components to reduce power usage comprises selecting a network device at which to place a virtual machine in the data center to minimize a network diameter calculated based on said routing distances; and
    wherein the components comprise network devices hosting virtual machines and automatically modifying the components comprises turning off power to one of the network devices or placing one of the network devices in a low power mode.

14. The logic of claim 13 wherein automatic modification of the components comprises selection of a network device at which to place a virtual machine in the data center to minimize a network diameter calculated based on said routing distances.

15. The logic of claim 13 wherein a number of virtual machines remaining at a network device is one and further comprising logic for moving the virtual machine to another network device and turning power off to the network device from which the virtual machine was moved.

16. The method of claim 1 wherein the controller comprises a Software-Defined Networking (SDN) controller.

17. The method of claim 1 wherein monitoring said power usage parameters comprises monitoring load predictions based on load history.

18. The apparatus of claim 6 wherein modifying components comprises reducing a topological distance communications travel within a tenant.

19. The apparatus of claim 18 wherein reducing said topological distance comprises replacing a remote connection with a local fiber or eliminating a pass through of a distribution switch.

* * * * *